United States Patent
Abraham et al.

(10) Patent No.: US 8,202,007 B2
(45) Date of Patent: Jun. 19, 2012

(54) MULTIPLE ROW, AXIALLY BIASED ANGULAR BALL BEARING AND METHOD FOR PRODUCTION THEREOF

(75) Inventors: Uwe Abraham, Recklinghausen (DE);
Manfred Winkler, Aurachtal (DE);
Georg Von Petery, Dachsbach (DE);
Andreas Droege, Oberreichenbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 769 days.

(21) Appl. No.: 12/302,755

(22) PCT Filed: May 4, 2007

(86) PCT No.: PCT/EP2007/054357
§ 371 (c)(1),
(2), (4) Date: Jan. 2, 2009

(87) PCT Pub. No.: WO2007/137929
PCT Pub. Date: Dec. 6, 2007

(65) Prior Publication Data
US 2009/0238509 A1    Sep. 24, 2009

(30) Foreign Application Priority Data
Jun. 1, 2006 (DE) .......................... 10 2006 025 551

(51) Int. Cl.
*F16C 19/30* (2006.01)
(52) U.S. Cl. ...................................................... 384/504
(58) Field of Classification Search .................. 384/504, 384/512, 513, 613
See application file for complete search history.

(56) References Cited

U.S. PATENT DOCUMENTS

| | | | |
|---|---|---|---|
| 1,367,610 A * | 2/1921 | Lehmann | 384/504 |
| 1,379,945 A | 5/1921 | Teetsow | |
| 1,783,791 A | 12/1930 | Hughes | |
| 1,908,474 A | 5/1933 | Dewees | |
| 2,651,554 A | 9/1953 | Recknagel | |
| 3,077,061 A | 2/1963 | St John | |
| 3,150,471 A | 9/1964 | Carlson | |
| 3,330,634 A | 7/1967 | Rae | |
| 4,783,182 A * | 11/1988 | Caron et al. | 384/504 |
| 4,798,482 A | 1/1989 | Kruk | |
| 5,557,854 A | 9/1996 | Fujioka | |
| 5,597,965 A | 1/1997 | Endo et al. | |
| 5,620,263 A | 4/1997 | Ohtsuki et al. | |
| 5,877,433 A | 3/1999 | Matsuzaki et al. | |
| 6,070,325 A | 6/2000 | Miyata et al. | |

(Continued)

FOREIGN PATENT DOCUMENTS
DE           331985 C     1/1921
(Continued)

*Primary Examiner* — Greg Binda
*Assistant Examiner* — Josh Skroupa
(74) *Attorney, Agent, or Firm* — Lucas & Mercanti, LLP; Klaus P. Stoffel

(57) ABSTRACT

A multiple-row and axially biased angular ball bearing with a one-piece outer ring and an inner ring that has two inner ring halves. In order to facilitate an easy and precise setting of the desired pretensioning force and to produce a transport-safe mount cartridge, it is intended that the axial distance of at least two close-end contact surfaces of the angular ball bearing should be equal to zero in the pretensioned state, and that the axial distance of at least two close-end contact surfaces of the angular ball bearing should be greater than zero in a non-pretensioned state.

13 Claims, 4 Drawing Sheets

U.S. PATENT DOCUMENTS

| | | | |
|---|---|---|---|
| 6,367,980 B1 * | 4/2002 | Kobayashi | 384/504 |
| 7,350,977 B2 * | 4/2008 | Fukuda et al. | 384/512 |
| 7,997,803 B2 * | 8/2011 | Mock et al. | 384/504 |
| 2004/0170344 A1 | 9/2004 | Tajima | |

FOREIGN PATENT DOCUMENTS

| | | | |
|---|---|---|---|
| DE | 81 10 141 | * | 8/1981 |
| DE | 81 101 41 XY | | 8/1981 |
| DE | 85 01 369 YD | | 4/1985 |
| DE | 3614558 | * | 11/1987 |
| DE | 39 25 388 YD | | 2/1991 |
| DE | 92 14 796 Y | | 12/1992 |
| DE | 1994-09-22 Y | | 9/1994 |
| DE | 196 03 701 AD | | 8/1997 |
| DE | 196 13 441 X | | 10/1997 |
| DE | 198 39 481 YD | | 3/2000 |
| DE | 100 57 861 YD | | 5/2002 |
| DE | 20 2004 001 454 Y | | 4/2004 |
| DE | 10 2004 043351 Y | | 3/2006 |
| DE | 102004043351 | * | 3/2006 |
| DE | 102006025551 A1 | | 12/2007 |
| EP | 16 93 580 X | | 8/2006 |
| EP | 16 93 581 X | | 8/2006 |
| GB | 22 86 231 X | | 8/1995 |
| JP | 05-256635 X | | 10/1993 |
| WO | 93/17 251 X | | 9/1993 |
| WO | 2006/018132 XY | | 2/2006 |
| WO | WO 2006018132 | * | 2/2006 |

* cited by examiner

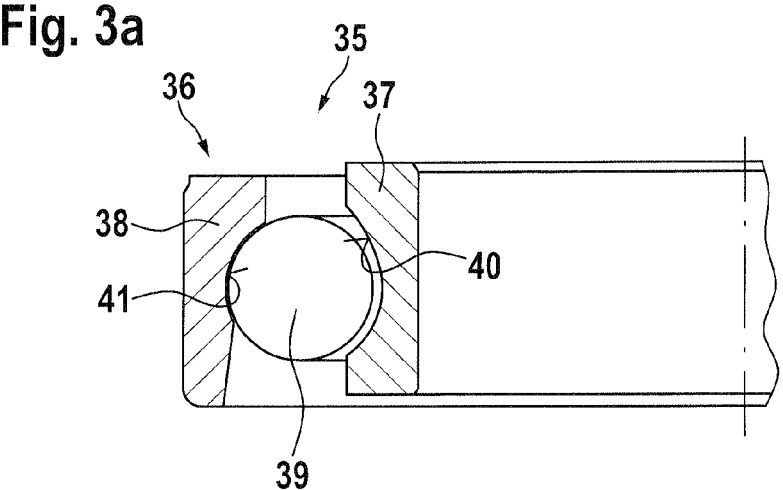
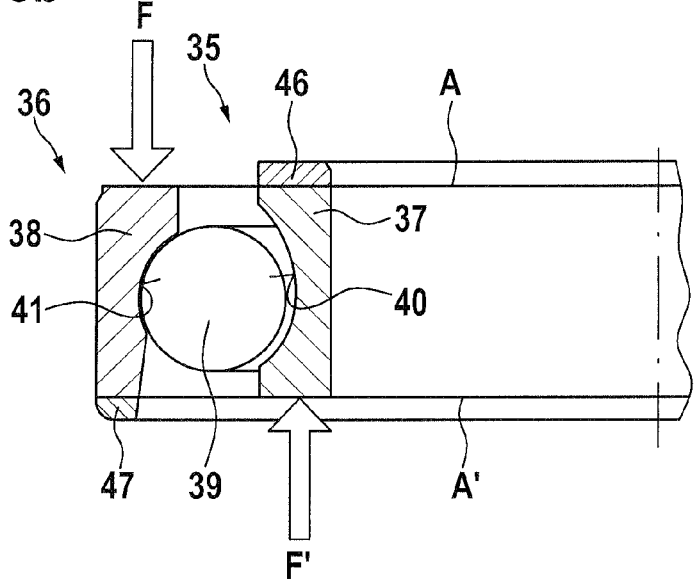
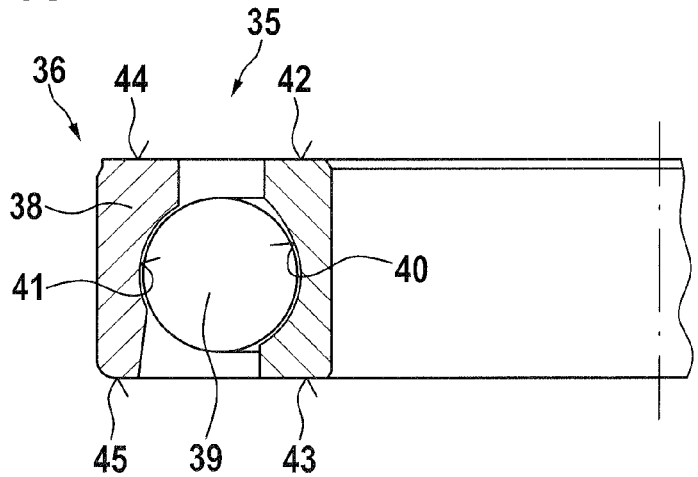

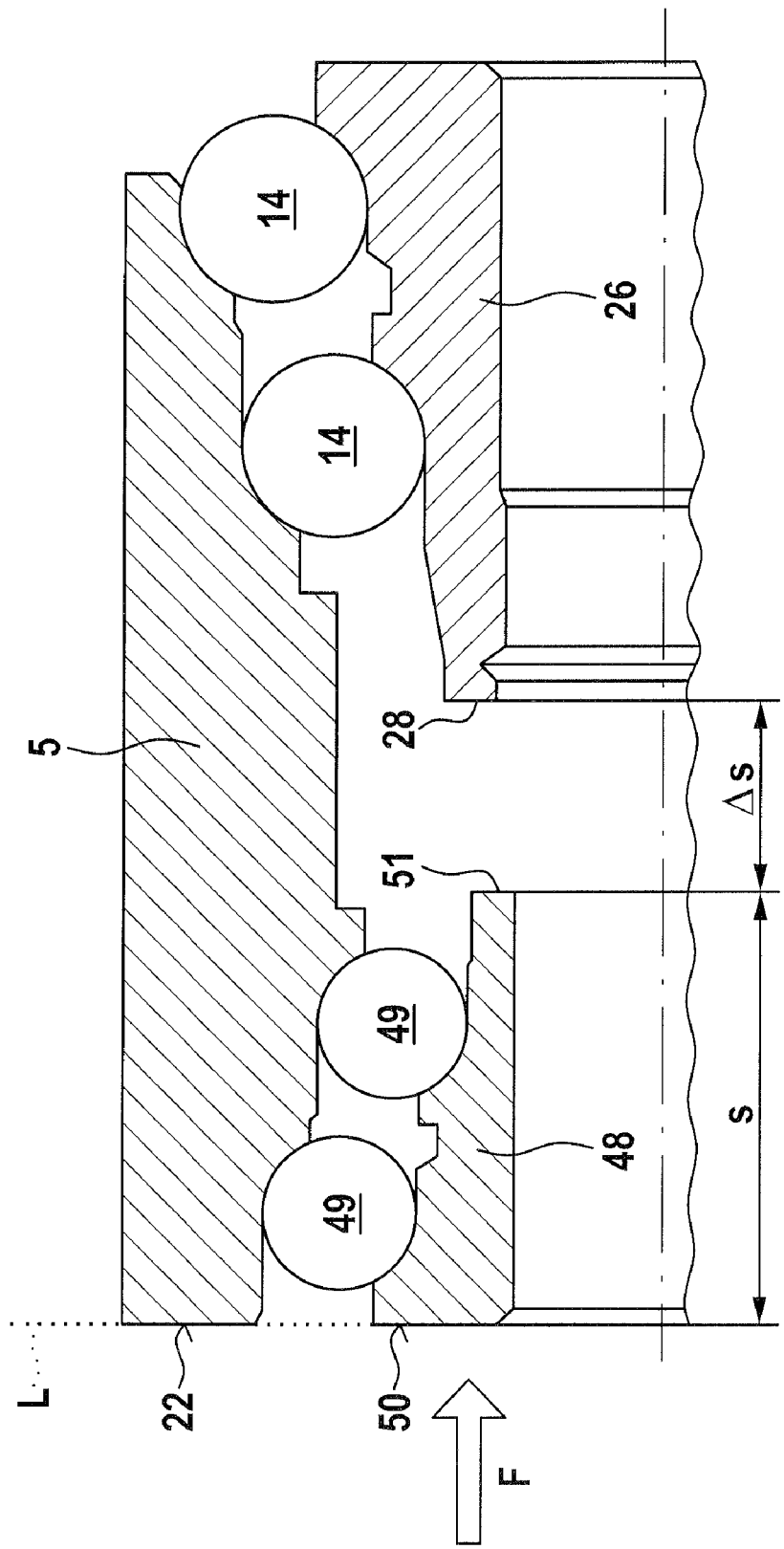

MULTIPLE ROW, AXIALLY BIASED ANGULAR BALL BEARING AND METHOD FOR PRODUCTION THEREOF

This application is a 371 of PCT/EP2007/054357 filed May 4, 2007, which in turn claims the priority of DE 10 2006 025 551.8 filed Jun. 1, 2006, the priority of both applications is hereby claimed and both applications are incorporated by reference herein.

FIELD OF THE INVENTION

The invention relates to a multiple-row and axially biased angular ball bearing with a one-piece outer ring and with an inner ring consisting of two inner ring halves, each inner ring half having at least one shoulder-delimited raceway which matches with a shoulder-delimited raceway of the outer ring, and in which there are arranged in the raceways bearing balls which are supported axially by the shoulders, at least one inner ring half being axially displaceable in order to set a play-free pretensioning force, and a clearance being present, at least in the unbraced state, between axially inner end edges of the inner ring halves.

BACKGROUND OF THE INVENTION

Rolling bearings, in particular multiple-row angular ball bearings, have to be braced in a directed manner during assembly, in order to ensure a satisfactory running of, for example, the bevel gear of a rear-axle differential. In the series assembly of structural units, for example bevel gear units, of identical type of construction, it has hitherto been customary to determine the respective bearing moment of friction for each structural unit beforehand by applying a defined axial force to the shaft rotating at a defined rotational speed. A collar nut is subsequently attached, mostly at another assembly location. This collar nut is in this case screwed until the bearing moment of friction previously determined for the defined axial force is established once again at the defined shaft rotational speed. This ensures that each structural or gear unit is braced in its rolling bearings with exactly the axial force previously applied.

DE 39 25 388 A1 describes a method for applying a defined pretensioning force to rolling bearings of a shaft, in particular to tapered roller bearings of a bevel wheel shaft of a bevel gear, a collar nut which engages on the shaft and is supported on a stay being screwed in a directed manner, taking into account bearing moments of friction previously determined. The pretensioning force is applied in that, starting from a just brace-free zero point, the collar nut is rotated through a pretensioning angle specific to the type of construction. The pretensioning angle specific to the type of construction must in this case be determined and can subsequently be applied to all structural units of the same type of construction, for example gear units of the same bevel gear.

A three-ring bearing, with at least three rows of rolling bodies and with an intermediate ring arranged between the inner and the outer ring, is known from DE 196 03 701 A1, the intermediate ring being arranged rotatably between two rolling body rows. Moreover, the inner and/or the outer ring likewise has raceways for two rolling body rows and is of split design, the amount of pretension being capable of being set jointly for all three rolling body rows by means of the parting point of the bearing ring. Since the outer system is connected in two ways, to be precise directly via the intermediate ring and indirectly via a rolling body row, the possibility for the different movement of the three rings being maintained, both systems are to be capable of being set by means of one operation, with the result that one rolling body row is to be saved. A rolling bearing of this type with an intermediate ring is suitable only for very special applications and cannot be used on a normal shaft.

DE 100 57 861 A1 discloses a single-row or two-row angular ball bearing for shafts rotating at extremely high speeds, for example of dental drills, which is not to be overloaded by pretensioning during start-up. In the state of rest, with the rotational speed equal to zero, the angular ball bearing is not pretensioned. A pretension is built up on the balls only as a result of rotation and the centrifugal forces at the same time occurring. The arrangement of the balls may take place selectively as a 0-package or as an X-package.

In DE 100 57 861 A1, a pretension controller is provided which varies the pretension as a function of specific operating conditions. The desired pretension is to be established only when the operating rotational speed is reached. In the state of rest, there is axial play, that is to say no pretension is to be set. The absence of pretension makes it possible to run up particularly quickly to the operating rotational speed. This describes, referring to FIG. 2 there, a 0-package consisting of two single-row angular ball bearings with a small axial play in the state of rest.

The axial play is set there in that one end face of the inner ring is machined by cutting in such a way that this end edge is in alignment with the end edge of the outer ring, this being intended to have the effect that the end edges of the inner and the outer ring can be brought into a blocked position with the end faces of the second single-row angular ball bearing. This arrangement is to ensure play, with the result that a tension-free and therefore rapid run-up of the shaft rotating at rotational speeds of above 500 000 rev/min is to become possible. A jamming of the balls between the rings due to the rise of the pretensioning force as a result of the ball centrifugal forces, because of very high rotational speeds, is thereby supposed to be avoided.

U.S. Pat. No. 3,150,471 describes bearing packages which are composed of a plurality of single-row bearings, to be precise of grooved ball bearings or four-point bearings. These are bearings which can absorb axial forces in two directions. The bearings described there have a reversal play in the event of a change in direction of the axial load, and a person skilled in the art can derive from this that the bearings are not pretensioned axially; this is also because the solution described there serves for the uniform force absorption of two or more bearings placed one against the other in tandem. Furthermore, U.S. Pat. No. 3,150,471 describes bearing packages of single-row ball bearings with split inner or outer rings, in which a more uniform load-bearing capacity of the two bearings is to be achieved under load by the projecting dimensions at the parting plane of the split inner or outer ring being ground down. The reason given for this measure is the elimination of the elastic compression which occurs to a differing extent under load from bearing to bearing.

DE 85 01 369 U1 discloses a four-row angular ball bearing with a one-piece outer ring and with a bearing inner ring consisting of two bearing inner ring halves, in which the axially movable bearing inner ring has at each of its outer ends a sliding surface inclined conically outward in the axial direction, a tension ring being arranged between this sliding surface and a radial surface. When a shaft is pushed through, the tension ring is displaced radially along the sliding surface, as a result of which the pretension of the bearing is to be set.

Finally, a power divider for a motor vehicle is known from DE 198 39 481 C2, in which a bevel pinion shaft is mounted in a gear case via two axially pretensioned rolling bearings spaced apart from one another, the rolling bearings being designed as two-row tandem angular ball bearings loadable on one side and set in an O-arrangement with respect to one another. The pretension is generated there in such a way that, by a collar nut being screwed onto the shank of the bevel pinion shaft, the bevel pinion is moved axially in the direction of the case, so that the two bearings are put under pretension. Between the two two-row angular ball bearings, on the shank of the bevel pinion shaft, a spacer sleeve is arranged which is supported, on the one hand, on the inner ring of the bearing and, on the other hand, on a step, not designated, of the shank. When the threaded part is tightened, first, the inner ring is displaced, so that a deformation force is exerted on the spacer sleeve.

Those previously known solutions in which a pretension, that is to say a play-free mounting of the balls between the inner and outer ring, plays a part have in common the fact that the amount of pretension can be set only very inaccurately or in a complicated way. Normally, the pretension is set by measuring the moment of friction or by displacement measurement. Furthermore, in bearings known hitherto, which are used, in particular, for the mounting of bevel pinion shafts, it is comparatively difficult to preassemble these.

The bearing manufacturer usually delivers the components of the bearing in individual parts to the final customer, for example a transmission or automobile manufacturer, who assembles the individual parts, to be precise, mostly, two two-row angular ball bearings with the bearing balls arranged between them, only at the time of mounting on the shaft to be supported. This leads to a considerable amount of time for assembly and, moreover, entails the risk of the loss of individual parts.

OBJECT OF THE INVENTION

The object on which the invention is based is to provide a multiple-row and axially biased angular ball bearing, in which the pretension can be set simply and accurately and which is designed as a bearing cartridge.

SUMMARY OF THE INVENTION

The invention is based on the realization that the set object can be achieved in that the pretension of the angular ball bearing is set when at least two end faces of the angular ball bearing which are designed as stop faces are in alignment with one another and in the non-pretensioned state are arranged out of alignment.

The invention is therefore based on a multiple-row, axially biased angular ball bearing with a one-piece outer ring and with an inner ring consisting of two inner ring halves, each inner ring half having at least one shoulder-delimited raceway which matches with a shoulder-delimited raceway of the outer ring, and in which there are arranged in the raceways bearing balls which are supported axially by the shoulders, at least one inner ring half being axially displaceable in order to set a play-free pretensioning force, and a clearance being present, at least in the unbraced state, between axially inner end edges of the inner ring halves. Moreover, there is provision for the axial clearance at least of two end bearing faces of the angular ball bearing to be equal to zero in the pretensioned state, and for the axial clearance at least of two end bearing faces of the angular ball bearing to be greater than zero in the tension-free state.

What is achieved advantageously by this set-up is that the pretension can be set according to the customer's requirements in the bearing manufacturer's factory, while the customer, as a rule an automobile manufacturer, merely has to mount the angular ball bearing into a blocked position. What is to be understood by this is that at least one inner ring half is displaced axially until one end edge of the inner ring half is in alignment with another end edge, for example of the outer ring or of the other end edge, that is to say the axial clearance between these edges is equal to zero. The axial displacement of the inner ring half takes place, for example, by means of a conventional collar nut which at the same time fixes the inner ring half in its position.

The correct setting of the pretension thus takes place by means of a simple edge-accurate displacement of at least one inner ring half with respect to the outer ring and/or to the other inner ring half. The pretension can consequently be set quickly and with process reliability, and this can be checked by means of the simplest possible aids, for example by optical measuring instruments.

A further advantage of the invention is to be seen in that an angular ball bearing configured in this way can be delivered as a ready-preassembled bearing cartridge, as it is known. The final customer merely has to push this bearing cartridge onto a shaft and set the pretension by means of the axial displacement of one inner ring half. A series of sometimes mechanically intensive work and safety steps necessary hitherto are thereby dispensed with. The angular ball bearing thus forms an easy-to-handle unit, in which the risk of the loss of or damage to individual components is ruled out virtually completely. This is the more so when the inner ring halves are secured axially, for example, by means of a clamp or by means of another suitable holding element, so that the inner ring halves cannot fall off. The holding element is in this case designed in such a way that a slight axial play to allow the setting of the pretension is ensured.

Moreover, there may be provision for the axial clearance of an end bearing face of the outer ring with respect to an end bearing face of an inner ring half to be equal to zero in the pretensioned state, and for the axial clearance of the end bearing face of the outer ring with respect to the end bearing face of the inner ring half to be greater than zero in the tension-free state. Here, therefore, the axially outer end edge of the inner ring half and the axial outer edge of the outer ring serve as a measuring point and fixed point for setting the desired pretension, thus making particularly simple assembly possible.

Alternatively to this, there may be provision for the axial clearance of an axially inner end bearing face of one inner ring half with respect to an axially inner end bearing face of the other inner ring half to be equal to zero in the pretensioned state, and for the axial clearance of the end bearing face of the inner ring half with respect to the axially inner end bearing face of the other inner ring half to be greater than zero in the tension-free state. In other words, here, the axially inner end edges of the inner ring halves meet one another when one inner ring half has been axially displaced bearing-inwardly until the correct amount of pretension is set.

In practical embodiments of the invention, there may be provision for the angular ball bearing to be designed as a four-row angular ball bearing, each inner ring half having two raceways and the outer ring having four raceways.

In another expedient development of the invention, the angular ball bearing is designed as a transportable bearing unit by means of a holding element connecting the inner ring halves. This embodiment can also be supplemented in that in each case a groove is introduced into radially inner surface areas of the inner ring halves, into which groove a securing ring provided with end clamps engages with axial play in the tension-free state of the angular ball bearing.

Moreover, there may be provision for the axial width of the inner ring and outer ring to be designed to be equal or unequal.

In other practical developments, there may be provision, cumulatively or alternatively, for the inner raceway and the outer raceway to have in each case different or identical diameters, or for the bearing balls to have different or identical diameters, or for the raceways of an angular ball bearing to have the same or a different pressure angle.

Other practical embodiments of the invention are distinguished in that the outer ring and/or the inner ring are/is produced by cutting, and/or in that the bearing balls of the two raceways of an angular ball bearing are guided in cages and have the same or a different diameter.

In a particularly preferred embodiment of the invention, the angular ball bearing is designed as a four-row angular ball bearing which is used for mounting a bevel pinion shaft in a power divider. To be precise, it has been shown, surprisingly, that the angular ball bearing according to the invention can be used particularly advantageously in a power divider of this type, since, there, the problems with regard to an exact and simple setting of the pretension required in each case are particularly serious.

Usually, two two-row angular ball bearings are used there, the desired pretension being set via deformable spacer sleeves arranged between the angular ball bearings, evidence of the prevailing pretensioning force being obtained via the amount of deformation or of the deformation displacement. This is ultimately not especially accurate, and therefore, in this very product sector, there is a great demand for the possibility of an exact setting of the pretensioning force. Moreover, the separate two-row angular ball bearings have to be mounted with great care and in a highly labor-intensive way. The configuration of the angular ball bearing as a four-row angular ball bearing is advantageous inasmuch as only one bearing part then has to be mounted.

In another advantageous development of this embodiment, there may be provision for the bevel pinion shaft to be mounted in a gear case and by means of a bevel pinion to drive via a crown wheel a differential mounted in the gear case, axle shafts being mounted in the differential and being connected operatively to one another via output wheels and pinions.

Furthermore, according to further embodiments, there may be provision for the inner ring half arranged adjacently to the bevel pinion of the bevel pinion shaft to be designed with a diameter and/or an axial length greater than those of the other inner ring half.

In a particularly practical development of the invention, there is provision for a compression bush to be arranged between the inner ring halves, while, furthermore, there may be provision for the compression bush to be mounted in grooves of the inner ring halves and to be connected positively to the inner ring halves.

The invention is also based on a method for the production of a multiple-row, axially biased angular ball bearing with a one-piece outer ring and with an inner ring consisting of two inner ring halves, each inner ring half having at least one shoulder-delimited raceway which corresponds to a shoulder-delimited raceway of the outer ring, and in which there are arranged in the raceways bearing balls which are supported axially by the shoulders, at least one inner ring half being displaced axially in order to set a play-free pretensioning force, and a clearance being set, at least in the unbraced state, between axially inner end edges of the inner ring halves.

In order to achieve a simple and accurate setting of the pretension on the angular ball bearing, according to the method, in a first step, a blank of the angular ball bearing, with an inner ring oversized in terms of axial width or an outer ring oversized in terms of axial width, is acted upon by an axial force corresponding to the pretensioning force and is secured, and, in a second step, the axial width of the blank is reduced in order to generate aligned bearing faces.

This method may be extended in that, in the second step, the axial width of one or of both of the inner ring halves of the inner ring or the axial width of the outer ring is reduced.

In an alternative embodiment of the method according to the invention, in the second step, the axial width of one or of both of the inner ring halves of the inner ring and the axial width of the outer ring are reduced.

Finally, the invention is based on a method, alternative to this, for the production of a multiple-row, axially biased angular ball bearing with a one-piece outer ring and with an inner ring consisting of two inner ring halves, each inner ring half having at least one shoulder-delimited raceway which matches with a shoulder-delimited raceway of the outer ring, and in which there are arranged in the raceways bearing balls which are supported axially by the shoulders, at least one inner ring half being displaced axially in order to set a play-free pretensioning force, and a clearance being set, at least in the unbraced state, between axially inner end edges of the inner ring halves.

In order to specify an alternative production method, there is provision whereby, in a first step, the outer ring and the inner ring half, with bearing balls arranged between them, are assembled, in a second step, a standard ring with the width "s" and oversized standard balls are connected to the outer ring, a clearance being set between the standard ring and the one inner ring half, in a third step, an axial force corresponding to the pretension to be set is applied to the standard ring and the standard ring is fixed, in a fourth step, the clearance "Δs" between the standard ring and said inner ring half is measured, and, in a fifth step, the other inner ring half is produced, the axial width of this other inner ring half corresponding to the sum of the width s of the standard ring and the clearance Δs.

BRIEF DESCRIPTION OF THE DRAWINGS

The invention is explained in more detail below by means of some embodiments, with reference to the accompanying drawing in which:

FIGS. 3a to 3c show pictures of method steps for producing an angular ball bearing according to the invention, in longitudinal section, and FIG. 4 shows a picture of an angular ball bearing, alternative to this, during its production.

DETAILED DESCRIPTION OF THE DRAWINGS

Figure 1:
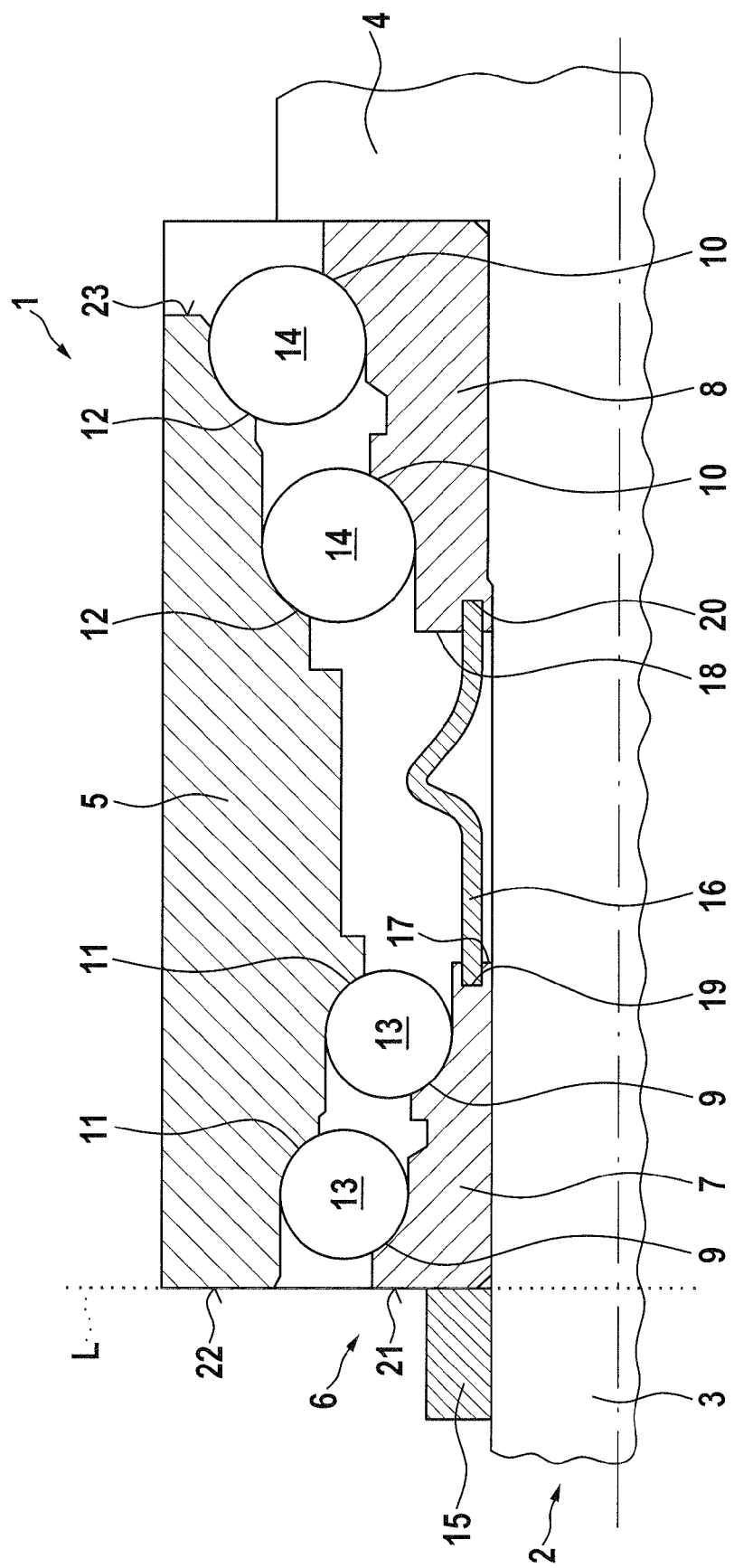
FIG. 1 shows a schematic illustration of a first exemplary embodiment of an angular ball bearing according to the invention.

FIG. 1 illustrates schematically a first exemplary embodiment of an angular ball bearing 1 according to the invention which is mounted on a bevel pinion shaft 2 of a rear-axle transmission, not illustrated in any more detail, of a motor vehicle. The bevel pinion shaft 2 has a stepped shank 3, at the right-hand side of which a bevel pinion 4, merely indicated, is arranged. The bevel pinion shaft 2 is held in a case, not illustrated, of the rear-axle transmission via the angular ball bearing 1.

The angular ball bearing 1 consists of a one-piece bearing outer ring 5 and of a split inner ring 6 which consists of a first inner ring half 7 forming the pinion flange bearing and of a second inner ring half 8 forming the pinion head bearing. The two inner ring halves 7 and 8 have in each case two radially outer shoulders 9 and 10 which, together with shoulders 11 and 12 of the outer ring 5, delimit raceways for bearing balls 13 and 14. The bearing balls 13 and 14 are each guided in bearing cages, not illustrated.

It may be gathered, further, from FIG. 1 that the bearing balls 13 and 14 possess a different diameter. Since the highest radial and axial loads on the bevel pinion shaft 2 occur in the vicinity of the bevel pinion 4, the second inner ring half 8 and its bearing balls 14 are dimensioned substantially larger than the first inner ring half 7 and the assigned bearing balls 13. By the two part bearings delimited by the inner ring halves 7, 8 being in an O-arrangement with respect to one another, this ensures that in each case one of the part bearings can absorb a force in the axial direction, that is to say an axial displacement of the bevel pinion shaft 2 is not possible.

The pretension, then, is generated in such a way that, by a collar nut 15 being screwed onto the shank 3 of the bevel pinion shaft 2, the first inner ring half 7 is moved axially to the right, so that the bearing balls 13 and 14 are put under pretension. Between the inner ring halves 7 and 8 is arranged a compression bush 16 which is connected positively to the bearing ring halves 7, 8, for which purpose grooves 19, 20, in which the compression bush 16 is received, are introduced in end edges 17, 18 of the inner ring halves 7, 8.

When the collar nut 15 is tightened, therefore, first, the first inner ring half 7 of the angular ball bearing 1 is displaced to the right. By the collar nut 15 being tightened, the shank 3 is also displaced axially to the left, at the same time taking along the inner ring half 8 of the angular ball bearing 1. By the axial clearance of the end faces 17 and 18 with respect to one another being shortened, the compression bush 18 is compressed, so that it is thrown radially upward in the direction of the outer ring 5. In the angular ball bearing 1 according to the invention, the compression bush 16 serves, on the one hand, as a screw safeguard for the collar nut 15 by setting a counterforce. On the other hand, the compression bush 16, connected positively to the two inner ring halves 7 and 8 during the production of the angular ball bearing 1, serves as a holding element, in order thereby to provide a transportable and transport-safe bearing unit which can be delivered to the final customer as a ready-preassembled and pretensioned bearing cartridge.

The first inner ring half 7 and the outer ring 5 have end bearing faces 21 and 22, the collar nut 15 bearing against the bearing face 21 of the first inner ring half 7. The bearing face 22 of the outer ring 5 may bear against a case wall, not illustrated. It is likewise possible for an axial bearing face 23 of the outer ring 5 to bear against a case wall.

The bearing faces 21 and 22 of the first inner ring half 7 and of the outer ring 5 are configured such that these bearing faces 21 and 22 are exactly in alignment with one another as soon as a predetermined pretension is set in the bearing 1 as a result of the axial displacement of the inner ring half 7 with respect to the outer ring 5. This pretension can be varied by means of the axial width of the first inner ring half 7 or of the outer ring 5. This state is illustrated in FIG. 1 by the dotted line L. As soon as the first inner ring half 7 and the outer ring 5 are axially in alignment with one another or are displaced flush with respect to one another, the desired amount of pretension is set, and this can be detected in a simple way by means of optical measuring systems.

Figure 2:
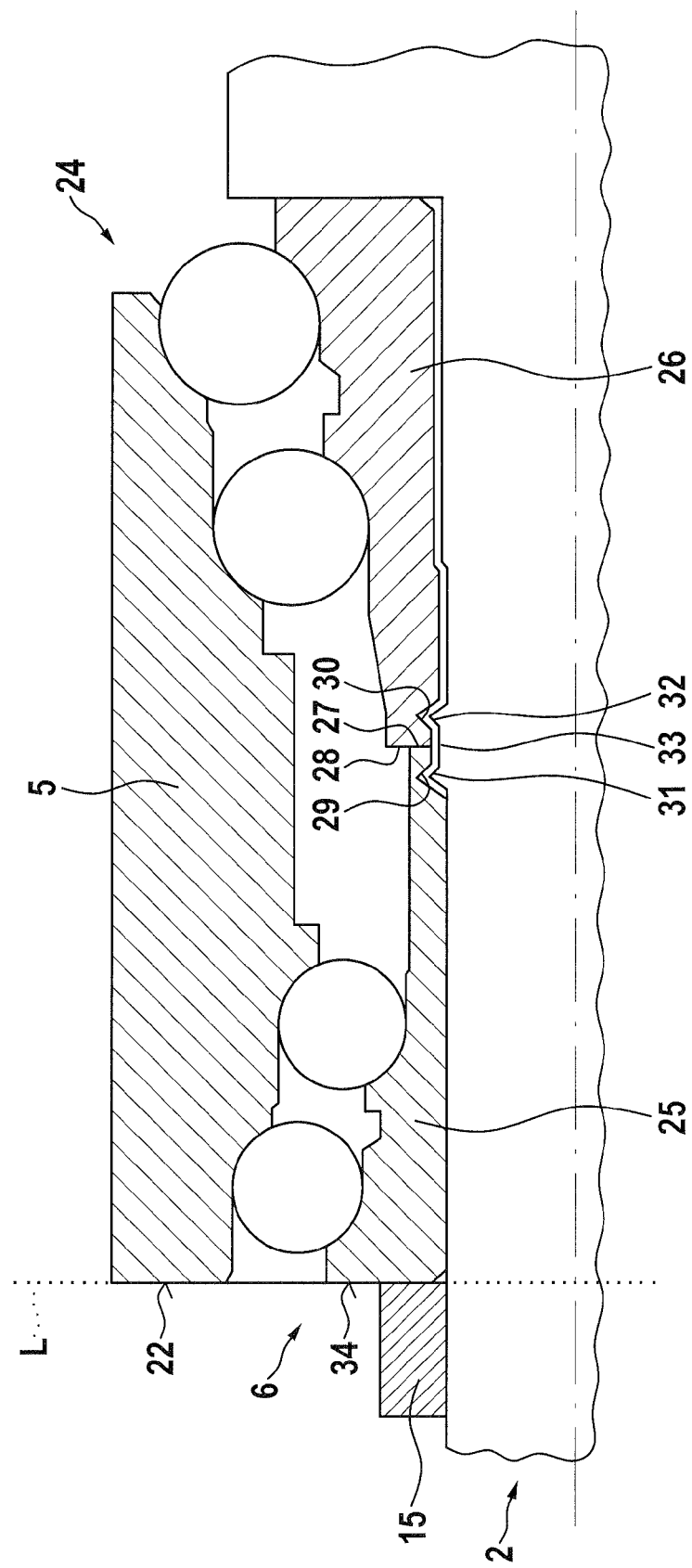
FIG. 2 shows a second exemplary embodiment of an angular ball bearing according to the invention.

FIG. 2 illustrates schematically a second exemplary embodiment of an angular ball bearing 24 according to the invention which, like the angular ball bearing 1 illustrated in FIG. 1, is mounted on a bevel pinion shaft 2 of a power divider, not illustrated in any more detail, of a motor vehicle. The angular ball bearing 24 likewise consists of a one-piece bearing outer ring 5 and of a split inner ring 6. The inner ring 6 likewise consists of two inner ring halves 25 and 26 which, in terms of their axially inner end edges 27, 28, are designed differently from the inner ring halves 7 and 8 illustrated in FIG. 1. The end edges 27, 28 acting as bearing faces butt one against the other in the pretensioned state, which is illustrated in FIG. 2, after the collar nut 15 has been tightened. As soon as the end edges 27 and 28 butt one against the other, the angular ball bearing 24 is blocked and the correct pretension is thereby set.

In the non-pretensioned, that is to say tension-free state, there is an axial clearance between the end edges 27, 28 of the two inner ring halves 25 and 26. A groove 29, 30 is introduced in each case into the radially inner surface areas of the inner ring halves 25 and 26, into which groove a securing ring 33 provided with end clamps 31, 32 engages in such a way that, in the tension-free state of the angular ball bearing 24, an axial play is made possible between the inner ring halves 25 and 26. Moreover, the inner ring halves 25 and 26 are held captively by the securing ring 33, so that the angular ball bearing 24 is designed as a transport-safe and transportable bearing unit or bearing cartridge.

FIG. 2 illustrates a state in which the bearing face 22 of the outer ring 5 is also in alignment with an end bearing face 34 of the inner ring half 25, so that the axial clearance between these bearing faces 22 and 34 is equal to zero, as indicated by the dotted line L. It is also possible, however, solely to tighten the axially inner end edges 27, 28 to blocking. Furthermore, the inner ring halves 25 and 26 may in each case also be provided with an additional recess or groove, into which can be inserted the compression bush 16, illustrated in FIG. 1, which then likewise serves as a screw safeguard for the collar nut 15.

FIGS. 3a to 3c illustrate schematically method steps for the production of an angular ball bearing according to the invention which is explained in simplified form by reference to a single-row angular ball bearing. In the angular ball bearings 1 and 24 according to the invention, however, the production principle is the same in the multiple-row, in particular four-row configuration with a one-piece outer ring 5 and a split inner ring 6.

FIG. 3a illustrates a blank 35 of an angular ball bearing 36, which, like the angular ball bearings 1 and 24, has an inner ring 37, an outer ring 38 and bearing balls 39 which are arranged between them and which rotate in raceways 40 and 41. In the state illustrated in FIG. 3a, the angular ball bearing 36 is not yet pretensioned. The inner ring 37 and outer ring 38 have an oversize in terms of their axial width.

FIG. 3b illustrates the next method step for producing a bearing according to the invention, in which the blank 35 of the angular ball bearing 36, with the inner ring 37 oversized in terms of width and the outer ring 38 oversized in terms of width, is acted upon by an axial force corresponding to the desired pretensioning force and is secured. Fixing and force application may take place by means of suitable tensioning tools which are not illustrated in any more detail. The arrows F and F' indicate the axial pressure load.

The black areas of the inner ring 37 and of the outer ring 38 indicate excessive deviations from the ideal lines A and A' which show on which line the bearing faces 42 and 43 of the inner ring 37 and the bearing faces 44 and 45 of the outer ring 38 would have to be arranged in order to be in alignment with one another. The bearing faces 42 to 45 therefore cannot yet be seen in FIG. 3b, but certainly in FIG. 3c. The areas marked black in FIG. 3b therefore illustrate projecting portions 46 and 47 to be removed.

In order to bring the bearing face 42 of the inner ring 37 into alignment with the bearing face 44 of the outer ring 38, the excess projecting portion 46 is removed in a subsequent production step. If the projecting portion 47 of the outer ring 38 is not likewise removed by grinding down, milling or in another suitable way, an X- or O-arrangement of the angular ball bearing 36 illustrated can be implemented. However, in order also to make it possible to have an X-type and tandem installation, the projecting portion 47 of the outer ring 38 must likewise be removed.

After the removal at least of at least one of the projecting portions 46, 47, the angular ball bearing 36 is detensioned again, with the result that the inner ring 37 and the outer ring 38 resume an arrangement with play in which the bearing faces 42 to 45 are out of alignment. In this state, the angular ball bearing 36 can be made ready for dispatch as a bearing cartridge.

FIG. 3c illustrates a state which corresponds to the conditions described with regard to FIG. 1, that is to say after installation in an intended component. In this state, the bearing faces 42 to 45 are exactly in alignment with one another, thus signaling to the fitter responsible for installation that the exact amount of pretension has been set.

FIG. 4 illustrates schematically an alternative method for producing an angular ball bearing according to the invention, this method being particularly suitable for producing the angular ball bearing 24 according to FIG. 2. First, the outer ring 5 and the inner ring half 26, with bearing balls 14 arranged between them, are assembled and are inserted into a device known per se. Subsequently, what is known as a master inner ring or standard ring 48 with tolerance-free standard balls 49 is introduced into the device from the other side. Standard rings are gages which, as a rule, have a smaller axial width than the inner ring used in practice. Standard balls are balls which can be inserted, free of play, into the standard ring 48 and therefore have a larger diameter than the bearing balls 13 from FIG. 1.

Subsequently, pressure, indicated by the arrow F, is exerted on the axially outer end edge 50 of the standard ring 48, specifically until the desired amount of pretension is set. In this position, the standard ring 48 is fixed. The clearance Δs between the axially inner end edge 51 of the standard ring 48 and the axially inner end edge 28 of the right inner ring half 26 is then measured. The width "s" of the standard ring 48 is added to the value of the clearance Δs. The sum then forms the width of the left inner ring half 25 to be manufactured.

LIST OF REFERENCE SYMBOLS

1 Angular ball bearing
2 Bevel pinion shaft
3 Shank
4 Bevel pinion
5 Outer ring
6 Inner ring
7 Inner ring half
8 Inner ring half
9 Shoulder
10 Shoulder
11 Shoulder
12 Shoulder
13 Bearing ball
14 Bearing ball
15 Collar nut
16 Compression bush
17 End edge
18 End edge
19 Groove
20 Groove
21 Bearing face
22 Bearing face
23 Bearing face
24 Angular ball bearing
25 Inner ring half
26 Inner ring half
27 End edge
28 End edge
29 Groove
30 Groove
31 Clamp
32 Clamp
33 Securing ring
34 Bearing face
35 Blank
36 Angular ball bearing
37 Inner ring
38 Outer ring
39 Bearing ball
40 Raceway
41 Raceway
42 Bearing face
43 Bearing face
44 Bearing face
45 Bearing face
46 Projecting portion
47 Projecting portion
48 Standard ring
49 Standard ball
50 End edge
51 End edge
F, F' Arrow, force
A, A' Ideal line
L Line, alignment line
S Gap
s Width of the standard ring 48
Δs Clearance between the standard ring 48 and inner ring half 26

The invention claimed is:

1. A multiple-row, axially biased angular ball bearing, which is rotatable about an axis of rotation, comprising:
   a one-piece outer ring having raceways and shoulders;
   an inner ring having two inner ring halves, each of the inner ring halves having a groove formed in a radially inner surface area of each of the inner ring halves, at least one shoulder and a raceway, the shoulders of the outer ring and the shoulder of each of the inner ring halves delimit the raceways of the outer ring and the at least one raceway of the inner ring;
   bearing balls, which are arranged between the outer ring and the inner ring halves, in the raceways of the outer ring and the raceway of each of the inner ring halves, supported axially by the shoulders of the outer ring and the shoulder of each of the inner ring halves; and
   a securing ring having end clamps that both extend away from the axis of rotation of the ball bearing and engage with axial play in a tension-free state of the angular ball bearing into the groove formed in the radially inner surface area of each of the inner ring halves,
   wherein at least one inner ring half is axially displaceable in order to set a play-free pretensioning force, and an axial clearance is present, at least in an unbraced state, between axially inner end edges of the inner ring halves, wherein the axial clearance of the axially inner end edges of the angular ball bearing is equal to zero in the pretensioned state, and wherein the axial clearance of at least two end bearing faces of the angular ball bearing is greater than zero in a tension-free state.

2. The angular ball bearing as claimed in claim 1, wherein the axial clearance of an end bearing face of the outer ring with respect to an end bearing face of an inner ring half is equal to zero in the pretensioned state, and the axial clearance of the end bearing face of the outer ring with respect to the end bearing face of the inner ring half is greater than zero in the tension-free state.

3. The angular ball bearing as claimed in claim 1, wherein the axial clearance of one of the axially inner end edges of one of the inner ring halves with respect to the other of the axially inner end edges of the other of the inner ring halves is equal to zero in the pretensioned state, and the axial clearance of the one of the axially inner end edges of the one of the inner ring halves with respect to the other of the axially inner end edges of the other of the inner ring halves is greater than zero in the tension-free state.

4. The angular ball bearing as claimed in claim 1, wherein the angular ball bearing is a four-row angular ball bearing, each of the inner ring halves have two raceways and the outer ring has four raceways for the bearing balls.

5. The angular ball bearing as claimed in claim 1, wherein securing ring connects the inner ring halves together to provide a transportable bearing unit.

6. The angular ball bearing as claimed in claim 1, wherein the inner ring has an axial width and the outer ring has an axial width and the axial width of the inner ring is equal to the axial width of the outer ring.

7. The angular ball bearing as claimed in claim 1, wherein the inner raceways and the outer raceways have different diameters.

8. The angular ball bearing as claimed in claim 7, wherein the bearing balls have different diameters.

9. The angular ball bearing as claimed in claim 7, wherein the inner raceways and the outer raceways have an identical pressure angle.

10. The angular ball bearing as claimed in claim 7, wherein the bearing balls of the inner raceways and the outer raceways of have different diameters.

11. The angular ball bearing as claimed in claim 1, wherein the outer ring and/or the inner ring are/is produced by cutting.

12. The angular ball bearing as claimed in claim 1, wherein the angular ball bearing is a four-row angular ball bearing, which is designed for mounting a bevel pinion shaft in a power divider.

13. The angular ball bearing as claimed in claim 12, wherein one of the inner ring halves, which is arranged adjacently to the bevel pinion of the bevel pinion shaft, has a diameter and/or an axial length that is greater than a diameter and/or an axial length of the other of the inner ring halves.

* * * * *